United States Patent
Allegretti et al.

(10) Patent No.: US 12,521,359 B2
(45) Date of Patent: Jan. 13, 2026

(54) COMPOSITION FOR THE TREATMENT OF MUSCLE WASTING

(71) Applicant: DOMPÉ FARMACEUTICI S.P.A., Milan (IT)

(72) Inventors: Marcello Allegretti, Rome (IT); Andrea Aramini, L'Aquila (IT); Gianluca Bianchini, L'Aquila (IT)

(73) Assignee: DOMPÉ FARMACEUTICI S.P.A., Milan (IT)

(*) Notice: Subject to any disclaimer, the term of this patent is extended or adjusted under 35 U.S.C. 154(b) by 876 days.

(21) Appl. No.: 17/619,733

(22) PCT Filed: Jun. 29, 2020

(86) PCT No.: PCT/EP2020/068271
§ 371 (c)(1),
(2) Date: Dec. 16, 2021

(87) PCT Pub. No.: WO2020/260700
PCT Pub. Date: Dec. 30, 2020

(65) Prior Publication Data
US 2022/0296551 A1    Sep. 22, 2022

(30) Foreign Application Priority Data
Jun. 28, 2019   (IT) .......................... 102019000010437

(51) Int. Cl.
*A61K 31/198* (2006.01)
*A61P 21/00* (2006.01)

(52) U.S. Cl.
CPC ............ *A61K 31/198* (2013.01); *A61P 21/00* (2018.01)

(58) Field of Classification Search
None
See application file for complete search history.

(56) References Cited

U.S. PATENT DOCUMENTS

2020/0069624 A1*  3/2020  Reiner ................ A61K 45/06
2022/0233651 A1*  7/2022  Seidensticker ...... A61K 31/455

FOREIGN PATENT DOCUMENTS

| EP | 3298908 | 3/2018 | |
| EP | 3298908 A2 * | 3/2018 | ........... A23L 33/175 |
| RU | 2578463 | 3/2016 | |
| WO | WO2007029730 | 3/2007 | |
| WO | WO02007864618 | 6/2007 | |
| WO | WO2018118957 | 6/2018 | |

OTHER PUBLICATIONS

Healthline.com When Should You Take BCAAs, published Aug. 19, 2018 (Year: 2018).*

(Continued)

*Primary Examiner* — Jeffrey S Lundgren
*Assistant Examiner* — Anthony Joseph Seitz
(74) *Attorney, Agent, or Firm* — HUESCHEN AND SAGE

(57) ABSTRACT

The present invention relates to compositions comprising branched-chain amino acids (BCAA) and the amino acid L-Alanine and their use in the prevention and/or treatment of muscle wasting associated to pathological or age-related conditions.

12 Claims, 2 Drawing Sheets

(56) References Cited

OTHER PUBLICATIONS

Figure 1:
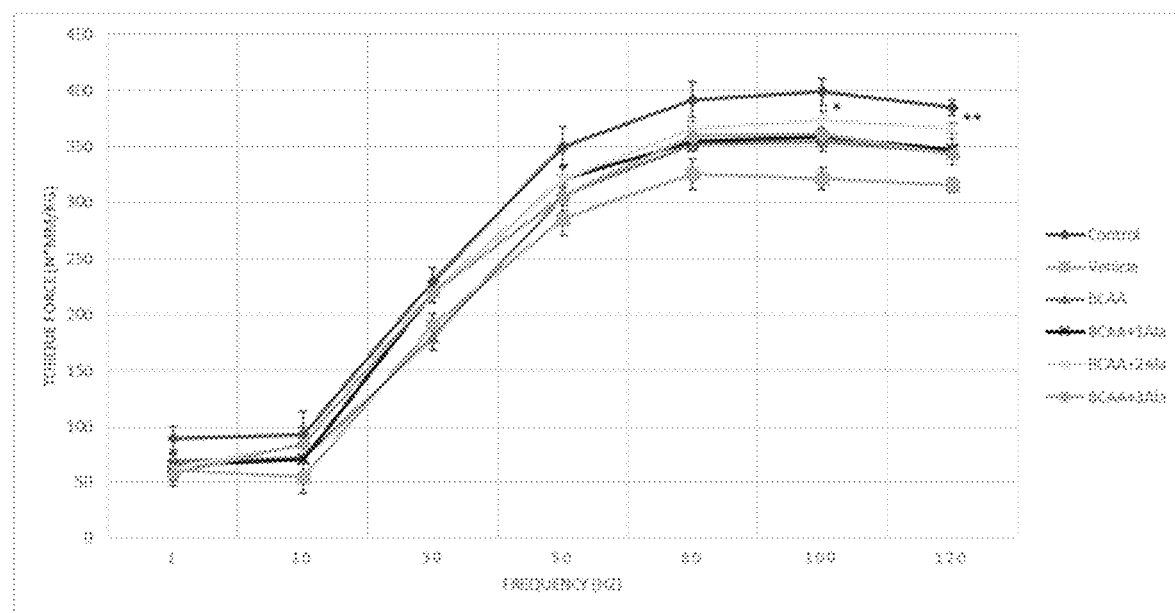

Yehui Duan, Bie Tan, Jianjun Li, Peng Liao, Bo Huang, Fengna Li, Hao Xiao, Yanhong Liu, Yulong Yin, Optimal branched-chain amino acid ratio improves cell proliferation and protein metabolism of porcine enterocytesin vivo and in vitro, Nutrition, vol. 54, 2018, pp. 173-181 (Year: 2018).*
International Search Report for PCT/EP2020/068271 dated Jul. 15, 2020.
Eley, et al., Biochem J., 2007, 407, 113-120.
English Abstract for RU 2578463, Mar. 27, 2016.
Maki, et al., Nutrition Research, 2012, 32, 676-683.
Okimura, In: Rajendram, R., Preedy, V., Patel, V. (eds) Branched Chain Amino Acids in Clinical Nutrition. Nutrition and Health. 2015, pp. 49-63.
Pierno, et al., J Physiol, 2007, 584, 983-995.

* cited by examiner

COMPOSITION FOR THE TREATMENT OF MUSCLE WASTING

FIELD OF THE INVENTION

The present invention relates to a combination of branched-chain amino acids (BCAA) and the amino acid L-Alanine, related pharmaceutical compositions or dietary supplements for use in the prevention and/or treatment of muscle wasting associated to pathological or age-related conditions.

BACKGROUND OF THE INVENTION

Skeletal muscle is a plastic organ that is maintained by multiple pathways regulating cell and protein turnover. Skeletal muscle proteins are constantly and simultaneously synthesized and degraded. The amount of protein in the muscle and the maintenance of skeletal muscle mass in the mature individual depends on the net muscle protein balance (NBAL), the difference between skeletal muscle protein synthesis (MPS) and breakdown (MPB). Growth factors, hormones, cytokines, nutrients, and mechanical loading can activate cellular signaling pathways that favor either protein synthesis or degradation leading to a gain or loss, respectively, of skeletal muscle mass.

Muscles are not only important for locomotion and the maintenance of posture but also provide the largest protein reservoir in the body and serve as a source of amino acids that can be used for energy production and gluconeogenesis by various organs (including the heart, liver and brain) during catabolic metabolism.

In some pathological conditions and in the elderly, an increased activation of proteolytic systems can be present, thereby contractile proteins and organelles are removed from the muscle, resulting in muscle atrophy. Excessive loss of muscle mass is associated with poor prognosis in several diseases, including myopathies and muscular dystrophies, as well as in systemic disorders such as cancer, diabetes, sepsis and heart failure. Muscle wasting occurs systemically in older people (a condition known as age-related sarcopenia), as a physiological response to fasting, malnutrition or immobility (e.g. postoperative) and in pathological conditions such as neuromuscular degenerative disorders (e.g. muscular dystrophy or atrophy), chronic obstructive pulmonary disorder, cancer-associated cachexia, diabetes, renal failure, cardiac failure, Cushing syndrome, sepsis, burn injuries, uremia, cirrhosis and AIDS.

It is strongly felt the need to develop compositions that are effective in prevention and/or treatment of muscle wasting.

Essential amino acids are biomolecules that cannot be synthesized by the human body and therefore need to be supplied in the diet. The branched-chain amino acids (BCAAs) Leucine, Valine, and Isoleucine account for 35% of the essential amino acids in muscles and are the most intensively-consumed essential amino acids during sporting activity.

A number of studies have demonstrated that BCAAs serve as substrate for protein synthesis and energy production and perform several metabolic and signaling functions, particularly via the activation of mTOR signaling pathway.

These effects are realized by the BCAAs themselves, especially Leucine, and by some of their metabolites. In fact, Leucine stimulates protein synthesis through the mTOR signaling pathway and phosphorylation of translation initiation factors and ribosomal proteins, while the inhibitory effect on proteolysis is mainly mediated by HMG (β-hydroxy-β-methylbutyrate) and branched-chain keto acids.

Interestingly, unlike most amino acids, the initial step of BCAAs catabolism takes place in skeletal muscle and not in the liver, because of the higher activity in this tissue of branched-chain-amino-acid aminotransferase (BCAT), the first enzyme responsible for BCAAs catabolic pathway. This gives a unique advantage to BCAA-based nutritional formulas compared with others as regards the effect on the improvement of muscle and brain function, since circulating BCAAs rapidly increase after protein intake and become readily available to extrahepatic tissues.

In view of the above, supplementation of BCAAs is widely used for athletes as an ergogenic aid to muscle health and anabolism, enhancing physical performance and skeletal muscle accretion and support muscle health and anabolism.

L-Alanine is a gluconeogenic amino acid and is one of the products of BCAAs catabolism that is also used in sport supplements. For example, Friliver® Sport Performance is a marketed dietary supplement comprising both BCCAs and L-Alanine and used to improve sport performance and to reduce fatigue.

SUMMARY OF THE INVENTION

The present inventors have found in animal models that administration of an oral formulation containing BCAAs combined with L-Alanine is particularly effective in preventing or treating those pathological or age-related conditions wherein muscle wasting occurs.

In particular, the present inventors have found that the combination with L-Alanine increases the plasma and muscle absorption of BCAAs.

Accordingly, it is an object of the present invention a composition comprising branched-chain amino acids (BCAAs) and L-Alanine for use in the prevention and/or treatment of muscle wasting associated to pathological conditions, age-related condition, or malnutrition, immobility or fasting.

Definitions

As used herein, the term "branched-chain amino acids (BCAAs)" refers to the amino acids L-Isoleucine, L-Leucine, and L-Valine.

FIGURES

FIG. 1 shows the force-frequency curves (N*mm/kg) produced by torque of the plantar flexor muscles of control mice (Control), and of mice subjected to hindlimb-unloading and treated with vehicle (Vehicle), BCAA plus L-Alanine at a weight ratio L-Leucine:L-Isoleucine:L-Valine:L-Alanine of 2:1:1:1 (BCAA+1Ala), 2:1:1:2 (BCAA+2Ala) or 2:1:1:3 (BCAA+3Ala), as described in Example 1 (BCAA+2Ala*vs BCAA $p<0.05$; BCAA+2Ala** vs BCAA $p<0.01$).

Figure 2:
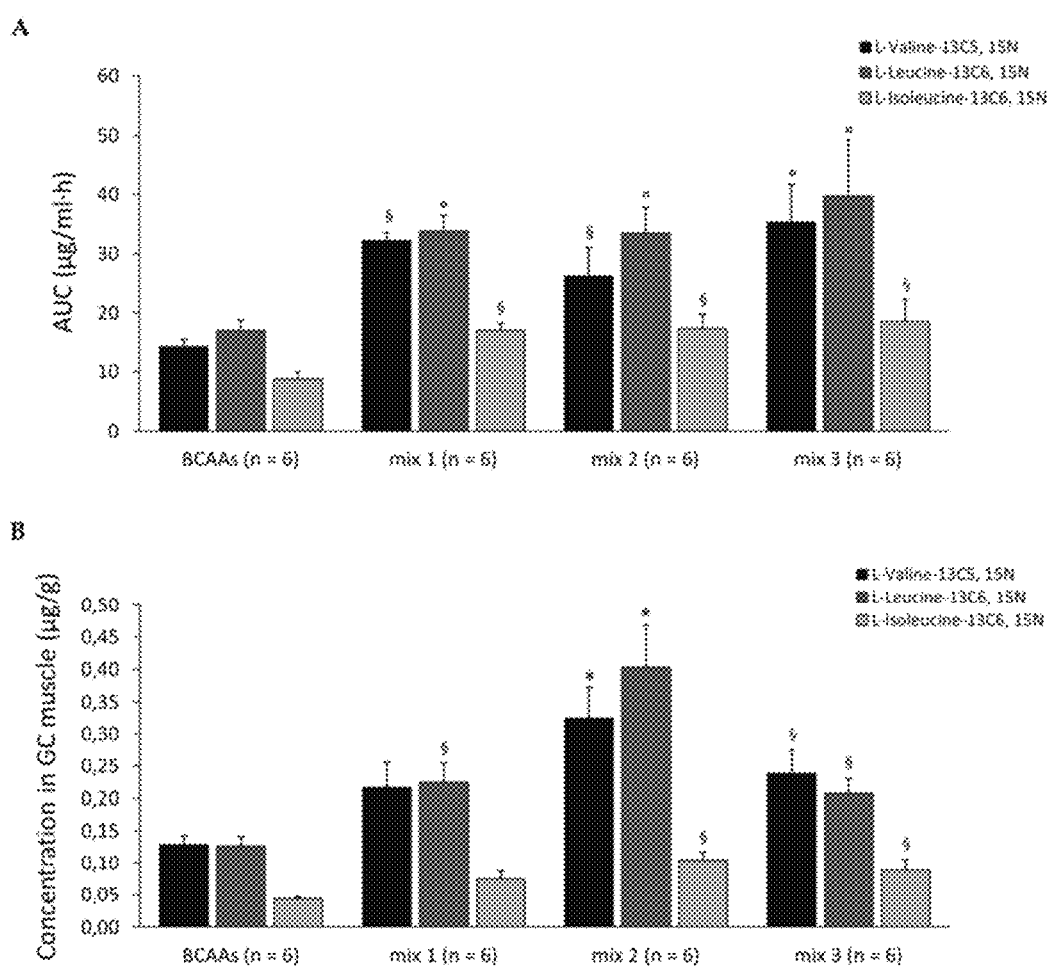

FIG. 2 shows:
in panel A, the plasma area under the curves (AUCs) of each labelled amino acid calculated for the time interval 0-24 h for mice treated with BCAAs alone (BCAAS) or BCAAs plus different amounts of L-Alanine (mix 1, 2 or 3), as described in Example 2. Values are expressed as mean±S.E.M. from the number of mice indicated in brackets. Statistically significant differences were found by ANOVA followed by Bonferroni post hoc vs ° BCAAs ($F>4.9$; $p<0.0001$). Statistically significant differences vs § BCAAs were found by unpaired Student's t-test (0.0005<p<0.05).

in panel B, the concentration for each labelled amino acid measured in GC muscle for each experimental group. Values are expressed as mean±S.E.M. from the number of mice indicated in brackets. Statistically significant differences were found by ANOVA followed by Bonferroni post hoc ° vs BCAAs (F>5.1; p<0.001). Statistically significant differences vs § BCAAs were found by unpaired Student's t-test (0.002<p<0.04).

DESCRIPTION

As will be demonstrated in the Experimental section, the present inventors have found in animal models of muscle wasting that a combination of BCAAs with L-Alanine is particularly effective in maintaining muscle mass and function in pathological conditions that cause muscle wasting.

Furthermore, the inventors have found that the combination of BCAAs with L-Alanine, increases significantly the plasma concentrations of BCAAs.

Therefore, the present invention relates to a composition comprising the branched-chain amino acids (BCCAs) L-Leucine, L-Valine and L-Isoleucine in combination with L-Alanine for use in the prevention, ameliorating and/or treatment of muscle wasting associated to:

i) pathological conditions;
ii) age-related conditions; or
iii) malnutrition, immobility or fasting.

Preferably, said muscle wasting is associated to a pathological condition selected from the group consisting of neuromuscular degenerative disorders, such as muscular dystrophy or muscular atrophy, chronic obstructive pulmonary disorder; cancer-associated cachexia; diabetes; renal failure: cardiac failure; Cushing Syndrome; sepsis; burn injuries; uremia; cirrhosis; and AIDS.

Preferably, said muscle wasting is associated to the age-related condition sarcopenia.

Preferably, in the above composition, the weight ratio L-Leucine:L-Valine:L-Isoleucine is between 2:1:1 and 8:1:1.

According to a preferred embodiment of the invention. L-Leucine, L-Valine and L-Isoleucine are present in the composition in a weight ratio of 2:1:1.

According to another preferred embodiment of the invention, the weight ratio L-Leucine:L-Valine:L-Isoleucine is 4:1:1.

According to another preferred embodiment of the invention, the weight ratio L-Leucine:L-Valine:L-Isoleucine is 8:1:1.

Preferably, in the composition of the invention the weight ratio between BCAAs and L-Alanine is between 5:1 and 1:1, preferably it is between 2.5:1 and 1.5:1, more preferably it is 2:1 or 1.6:1.

According to a particularly preferred embodiment, the weight ratio L-Leucine:L-Valine:L-Isoleucine:L-Alanine is 2:1:1:2.

In fact, as demonstrated in the experimental section and shown in FIG. 1. surprisingly, at this specific ratio a particularly evident synergistic effect is observed between the amino acids of the combination (BCAA+2Ala), with a significant improvement of neuromuscular function compared to control or to the combination of the same amino-acids at different weight ratios (see FIG. 1).

According to one embodiment, the composition for use according to the invention is a pharmaceutical composition.

Said pharmaceutical composition preferably comprises said BCAAs and L-Alanine, preferably in the ratios indicated above, in admixture with at least one pharmaceutically acceptable vehicle, excipient or adjuvant.

Particularly useful may be formulation adjuvants such as, for example, solubilizing, dispersing, emulsifying and/or suspension agents.

According to an alternative embodiment, the composition for use according to the invention is a dietary supplement. Preferably, said dietary supplement comprises said BCAAs and L-Alanine, preferably in the ratios indicated above, in admixture with at least one acceptable vehicle or excipient for human use.

Preferably, the composition of the invention, preferably as pharmaceutical composition or dietary supplement, is suitable for oral administration.

The compositions for oral administration of the invention may be solid or liquid formulations. Preferred formulations of the invention contemplate pharmaceutical forms selected from the group consisting of granulate, tablet, capsule, effervescent tablet, oral suspension, emulsion, powder, solution, gel or syrup. The most preferred pharmaceutical form according to the invention is a granulate for oral suspension in a liquid, preferably water.

Preferably said composition, preferably as pharmaceutical composition or dietary supplement, does not contain any other active compounds in addition to BCAAs and L-Alanine.

Preferably, said composition, preferably as a pharmaceutical composition or dietary supplement, is formulated so as to contain the following amount of BCAAs an L-Alanine per unit dose: between 0.6 and 1 g, preferably 0.8 g of L-Leucine, between 0.3 and 0.5 g, preferably 0.4 g of L-Isoleucine, between 0.3 and 0.5 g. preferably 0.4 g of L-Valine and from 0.4 g to 1.2 g, preferably 0.8 g of L-Alanine.

Preferably said unit dose is administered twice a day.

EXPERIMENTAL SECTION

All the experiments were conducted in conformity with the Italian Guidelines for Care and Use of Laboratory Animals (D.L.116/92), and with the European Directive (2010/63/UE). The study belongs to studies approved by national ethic committee for research animal welfare of the Italian Ministry of Health as far as ethical issues and adherence to law are concerned. Most of the experimental procedures used in the present study are approved by international scientific networks working on animal models of neuromuscular diseases (http://www.treat-nmd.eu/research/preclinical/SOPs/).

Statistics

All experimental data were expressed as mean±standard error of the mean (S.E.M.). Multiple statistical comparisons between groups were performed by one-way ANOVA, with Bonferroni's t test post hoc correction when the null hypothesis was rejected (p<0.05), to allow a better evaluation of intra- and inter-group variability and avoiding false positive. If necessary, single comparisons between two means (modified formulations vs vehicle or vs standard formulation) were performed by the unpaired Student's t-test.

Example 1

Preclinical Evaluation in a Mouse Model of Muscular Atrophy (HU Mouse)

a) Treatment of Animals

Adult male C57BL/6J mice (12-14 weeks-old) were purchased from Charles River (Calco, Italy). Mice were subdivided in 4 groups of 8 animals, one control group and 3 hindlimb-unloaded (HU) groups. The animals of HU group were suspended individually in special cages for 2 weeks using a method similar to that used previously for HU rats (Piemo S. et al. J Physiol 2007:584:983-95.1. A thin string was linked atone extremity to the tail by sticking plaster and at the other extremity to the top of the cage. The length of the string was adjusted to allow the animals moving freely on the forelimbs, while the body was inclined at 30-40° from the horizontal plane. All mice had water ad libitum and received 8 g a day of standard rodent chow. The food remaining on the day after was weighted to calculate daily food consumption Mice were subdivided in 4 groups of 8 animals:

1) Control group: the mice were housed individually in control conditions for 4 weeks;
2) Vehicle group: the mice were housed individually for 4 weeks, and were hindlimb unloaded for the last 2 weeks. During this period, they received the vehicle (water);
3) BCAA group: the mice were housed individually for 4 weeks, received mix BCAA (L-Leucine 328 mg/kg; L-Isoleucine 164 mg/kg; L-Valine 164 mg/kg) once a day for 4 weeks, and were hindlimb unloaded for the last 2-weeks;
4) BCAA+1Ala group: the mice were housed individually for 4 weeks, received mix BCAA+1Ala (L-Leucine 328 mg/kg; L-Isoleucine 164 mg/kg; L-Valine 164 mg/kg plus L-Alanine 164 mg/kg) once a day for 4 weeks, and were hindlimb unloaded for the last 2-weeks;
5) BCAA+2Ala: the mice were housed individually for 4 weeks, received mix BCAA+2Ala (L-Leucine 328 mg/kg; L-Isoleucine 164 mg/kg; L-Valine 164 mg/kg plus L-Alanine 328 mg/kg) once a day for 4 weeks, and were hindlimb unloaded for the last 2-weeks;
6) BCAA+3Ala: the mice were housed individually for 4 weeks, received mix BCAA+3Ala (L-Leucine 328 mg/kg; L-Isoleucine 164 mg/kg; L-Valine 164 mg/kg plus L-Alanine 492 mg/kg) once a day for 4 weeks, and were hindlimb unloaded for the last 2-weeks.

Each formulation was prepared dissolving the powder in filtered tap water, in order to obtain the final concentration. This was obtained by direct preparation, considering the weekly amount of water consumed by each mouse and its body weight. The duration of the treatment was of 4 weeks.

The HU animals were examined daily over the entire HU period for behavior, cleanliness, aspect of hairs and eyes, food and water consumption. Daily food intake was measured as the mean value of the quantity of commercial food (in grams) eaten each day over 14 days by the mice belonging to CTRL and HU groups. All mice underwent the protocol of treatment without showing any sign of stress (lack of appetite, abnormal body weight loss, hair loss, stereotypic or aggressive behavior, etc.) or macroscopic alterations of vital functions. No significant variations in the body weight of animals, either treated or not, were observed throughout the experimental window.

b) In Vivo Torque Experiment

In vivo neuromuscular function was assessed in all the above animal groups by measuring the maximal isometric torque of the plantar flexor muscle group (GC and soleus muscles) at the various time points in anesthetized mice. Mice were anesthetized via inhalation (~4% isoflurane and 1.5% O2 l/min) and placed on a thermostatically controlled table; anesthesia was maintained via a nose cone (~2% isoflurane and 1.5% O2 l/min). The right hindlimb was shaved and aseptically prepared, and the foot was placed on the pedal connected to a servomotor (model 300C-LR; Aurora Scientific, Aurora, ON, Canada). Contractions were elicited by percutaneous electrical stimulation of the tibial nerve via needle electrodes (Chalgren Enterprises) connected to a stimulator (model 701B; Aurora Scientific) to induce contraction of the group of plantar flexor muscles. The current was adjusted from 30 to 50 mA until maximal isometric torque was achieved. A series of stimulations were then performed at increasing frequencies: 1, 10, 30, 50, 80, 100 and 120 Hz with a pulse train of 200 ms. Data were analyzed using Dynamic Muscle Analysis software (DMAv5.201; Aurora Scientific) to obtain torque, which was normalized to mouse body mass. Normalized values were used to construct torque-frequency curves.

The results obtained are shown in FIG. 1.

The peak of muscle contraction is reached at a frequency of about 80-120 Hz. Between 10 and 60 Hz the force recorded in the groups is similar because at low frequencies less force is produced than at higher frequencies of stimulation, for this reason there is no significant difference between a healthy fibre (control) and a sick fibre (vehicle). At frequencies higher than 60 Hz the muscle begins to contract to reach the contraction peak at 80-120 Hz. It is at this stage that the differences between a healthy and a sick fibre begin to be seen. Furthermore, with the same pulse, a fibre damaged by disuse has less strength than a healthy fibre.

As can be seen from FIG. 1, the torque measurements in anesthetized animals disclosed muscle disuse condition (i.e. weakness) in hindlimb-unload mice compared to the sedentary group. Furthermore, the data clearly shows that administration of BCAAs and L-Alanine improves the neuromuscular function of the plantar flexor muscle (mainly GC and soleus muscles). This effect is surprisingly higher in the BCAA+2Ala group compared to all other groups. This group shows a significantly higher torque-frequency values compared to the other treated groups. In particular, the maximal torque value, produced at 120 Hz, almost overlapped that from the sedentary mice group (385±7 vs 366±5 N*mm/kg; n=8).

Example 2

Pharmacokinetic Study

A preliminary pharmacokinetic evaluation of tested amino acids distribution in plasma and skeletal muscle from C57BL/6J wild type (WT) mice was conducted.

A total of 24 (n=6 mice per group), 10-week-old, male C57BL/6J WT mice (Harlan, Italy) were used for the PK study. Once received from the supplier, all mice were subjected to health examinations and acceptance, and then housed in suitable cages (a maximum of 5 mice per cage) and acclimatized to local housing conditions for approximately 5 days. The animals were routinely kept in the following environment except for short periods of time where experimental procedures dictated otherwise. Mice were housed in a single, exclusive room, which was air conditioned to provide a minimum of 15 air changes/hour. Environmental controls were set to maintain temperature within the range from 22 to 24° C. and relative humidity within the range from 50 to 60% with an approximate 12 hours light and 12 hours dark cycle that was controlled automatically. Food (Standard GLP diet, Mucedola, Settimo Milanese, MI, Italy) and water were available ad libium throughout the study. All animals were weighed on treatment day (with body weights ranging from 25 to 30 g) and then assigned randomly to each experimental group uniquely identified with a colored spray on the back before the experiment. Clinical signs were monitored at regular intervals throughout the study in order to assess any reaction to treatments. The night before the administration of labelled amino acids, animals were fasted; food was re-inserted in cages 3 hours after amino acid supplementation.

The mice where divided in four experimental groups, which were orally administrated with the mixture of 13C6 and 15N labelled BCAAs alone (BCAAs) or in combination with different amounts of L-Alanine (mix 1, mix 2 and mix 3), with the aim to evaluate the effect of L-Alanine supplementation on the pharmacokinetic parameters of BCAAs. In addition, amino acids content in GC muscle was also evaluated.

In details the animals were treated with the following aminoacids:
Group 1 (BCAAs group): L-Leucine-13C6, 15N: 328 mg/kg; L-Isoleucine-13C6, 15N: 164 mg/kg; L-Valine-13C5, 15N: 164 mg/kg;
Group 2 (mix 1 group): L-Leucine-13C6, 15N: 328 mg/kg; L-Isoleucine-13C6, 15N: 164 mg/kg; L-Valine-13C5, 15N: 164 mg/kg, L-Alanine: 164 mg/kg;
Group 3 (mix 2 group): L-Leucine-13C6, 15N: 328 mg/kg: L-isoleucine-13C6, 15N: 164 mg/kg; L-Valine-13C5, 15N: 164 mg/kg, L-Alanine: 328 mg/kg;
Group 4 (mix 3 group): L-Leucine-13C6, 15N: 328 mg/kg; L-isoleucine-13C6, 15N: 164 mg/kg; L-Valine-13C5, 15N: 164 mg/kg, L-Alanine 492 mg/kg.

The formulations were prepared by dissolving the amino acid mixture powder in 1.5% w/w citric acid aqueous solution. Animals were treated by single oral gavage at 15 ml/kg as administration volume. Blood samples (50-60 µl) were collected at 15 min, 30 min, 1 h, 3 h, 8 h, 24 h in heparinized centrifuge tubes (Heparin Vister 5000 U.I./ml), gently mixed and immediately placed on ice. Then, tubes were centrifuged (15 min, 3500×g, 4° C.), and resulting plasma was collected and transferred to uniquely labelled tubes and frozen at −80° C. until further PK analysis. At the end of the study, mice animals were sacrificed by exsanguination under deep isoflurane anesthesia (EZ-1800 system provided by WPI. USA). Gastrocnemius (GC) muscles were collected at the time of the sacrifice, washed in saline, dried on blotting paper and homogenized in saline using CK14 tubes (Precellys® 0.5 mL Soft Tissue Homogenizing Lysing Kit, Cayman Chemical, MI, USA) and Bertin homogenizer with a dilution 1/5 w/v (g/ml). Samples were centrifuged after homogenization. Human albumin was used as a surrogate to generate the calibration curve for amino acids analysis from 25 to 2000 µg/ml whereas some of the samples were further diluted 1:5 in buffer. Both plasma and muscles samples were analyzed by clean-up and derivatization using the EZfaast™ amino acid analysis kit (Phenomenex, Castel Maggiore, 80, Italy) and analyzed by UPLC-MSMS (UPLC Shimadzu model LC-20AD equipped with ABSciex API 45000 mass spectrometer).

Plasma area under the curves (AUCs) were calculated for the time interval 0-24 h and are reported in FIG. 2, panel A.

Surprisingly, all groups treated with L-Alanine showed a significant increase in the plasma concentrations of BCAAs. In particular, plasma exposure of BCAAs in L-Alanine-treated groups was more than double compared to the BCAAs group.

This results demonstrates that L-Alanine contributes to increase absorption of BCAAs.

Also, GC muscles were collected at the time of the sacrifice (24 h) and analyzed for amino acids content. The concentrations of labelled BCAAs are reported in FIG. 1B.

The data show that a statistically significant increase in BCAAs muscle content was found for all ALA-treated groups compared to BCAAs. In particular, the mix 2 group showed the highest concentrations of each BCAA compared to the standard formulation (FIG. 2, panel B).

These data demonstrate that the BCAAs/AL A ratio strongly influences BCAAs distribution in muscle tissue, thus providing a plausible rationale to the specific effects on muscle function observed in the animal model in Example 1.

The invention claimed is:

1. A method of preventing, ameliorating and/or treating muscle wasting associated with:
   i) pathological conditions;
   ii) age-related conditions; or
   iii) malnutrition, immobility or fasting,
in a subject in need of such prevention, amelioration, and/or treatment, comprising administration of an amount of a composition comprising branched-chain amino acids (BCAAs) L-Leucine, L-Valine and L-Isoleucine in combination with L-Alanine, wherein L-Leucine, L-Valine, L-Isoleucine and L-Alanine are the only pharmaceutically active amino acids present in the composition, which composition is effective for preventing, ameliorating and/or treating muscle wasting associated with pathological conditions; age-related conditions; or malnutrition, immobility or fasting.

2. The method according to claim 1, wherein the muscle wasting is associated with a pathological condition selected from the group consisting of neuromuscular degenerative disorders, including muscular dystrophy and muscular atrophy; chronic obstructive pulmonary disorder; cancer-associated cachexia; diabetes; renal failure; cardiac failure; Cushing Syndrome; sepsis; burn injuries; uremia; cirrhosis; and AIDS.

3. The method according to claim 1, wherein the muscle wasting is associated with the age-related condition sarcopenia.

4. The method according to claim 1, wherein L-Leucine, L-Valine and L-Isoleucine are present in the composition in a weight ratio between 2:1:1 and 8:1:1.

5. The method according to claim 1, wherein L-Leucine, L-Valine and L-Isoleucine are present in the composition in a weight ratio of 2:1:1 or 4:1:1 or 8:1:1.

6. The method according to claim 1, wherein the weight ratio L-Leucine:L-Valine:L-Isoleucine:L-Alanine is 2:1:1:2.

7. The method according to claim 1, wherein the composition is a pharmaceutical composition.

8. The method according to claim 1, wherein the composition is a dietary supplement.

9. The method according to claim 1, wherein the composition is administered orally.

10. The method according to claim 1, wherein the composition contains per unit dose: between 0.6 and 1 g of L-Leucine, between 0.3 and 0.5 g of L-Isoleucine, between 0.3 and 0.5 g of L-Valine and from 0.4 g to 1.2 g of L-Alanine.

11. The method according to claim 10, wherein the composition contains per unit dose: 0.8 g of L-Leucine, 0.4 g of L-Isoleucine, 0.4 g of L-Valine and 0.8 g of L-Alanine.

12. The method according to claim 10, wherein the unit dose is administered twice a day.

\* \* \* \* \*